United States Patent
Lin et al.

(10) Patent No.: US 10,401,915 B2
(45) Date of Patent: Sep. 3, 2019

(54) ELECTRONIC DEVICE

(71) Applicants: Che-Hsien Lin, Taipei (TW);
Po-Hsiang Hu, Taipei (TW)

(72) Inventors: Che-Hsien Lin, Taipei (TW);
Po-Hsiang Hu, Taipei (TW)

(73) Assignee: COMPAL ELECTRONICS, INC.,
Taipei (TW)

(*) Notice: Subject to any disclaimer, the term of this patent is extended or adjusted under 35 U.S.C. 154(b) by 0 days.

(21) Appl. No.: 15/682,567

(22) Filed: Aug. 22, 2017

(65) Prior Publication Data

US 2018/0143668 A1    May 24, 2018

Related U.S. Application Data (60) Provisional application No. 62/424,525, filed on Nov. 20, 2016.

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
CPC .... G06F 1/1681; G06F 1/1601; G06F 1/1615; G06F 1/1616; E05D 11/0054; E05D 11/1078; E05D 3/06; E05D 7/00
See application file for complete search history.

(56) References Cited

U.S. PATENT DOCUMENTS

| | | | |
|---|---|---|---|
| 2005/0201047 A1* | 9/2005 | Krah | G06F 1/1616 361/679.55 |
| 2015/0047446 A1* | 2/2015 | Lai | E05D 3/12 74/96 |

FOREIGN PATENT DOCUMENTS

| CN | 2732938 | 10/2005 |
|---|---|---|
| CN | 201663771 | 12/2010 |
| CN | 204790680 | 11/2015 |

OTHER PUBLICATIONS

"Office Action of Taiwan Counterpart Application," dated Nov. 17, 2017, p. 1-p. 6, in which the listed references were cited.

\* cited by examiner

*Primary Examiner* — Dimary S Lopez Cruz
*Assistant Examiner* — Ingrid D Wright
(74) *Attorney, Agent, or Firm* — JCIPRNET (57) ABSTRACT

An electronic device includes an upper body, a lower body and a dual-shaft hinge module. The upper body includes a display module and an upper decoration plate covering a portion of the display module. The lower body includes an input module and a lower decoration plate covering a portion of the input module. The dual-shaft hinge module pivotally connects the upper body to the lower body, and includes a bottom plate, and a first and a second curled-circular parts bent extending from two opposite sides of the bottom plate. When the upper body is flipped open relative to the lower body, the upper and lower decoration plates respectively cover the first and second curled-circular parts. When the upper body covers the lower body, the upper and lower decoration plates respectively extend between the first curled-circular part and the bottom plate and between the second curled-circular part and the bottom plate.

10 Claims, 8 Drawing Sheets

ELECTRONIC DEVICE

CROSS-REFERENCE TO RELATED APPLICATION

This application claims the priority benefit of U.S. provisional application Ser. No. 62/424,525, filed on Nov. 20, 2016. The entirety of the above-mentioned patent application is hereby incorporated by reference herein and made a part of this specification.

BACKGROUND OF THE INVENTION

Field of the Invention

The invention relates to an electronic device, and more particularly, to a foldable electronic device.

Description of Related Art

In a currently existing foldable electronic device, an upper body and a lower body are pivotally connected to each other by a hinge structure, so that the upper body can be opened or closed relative to the lower body. However, the hinge structure between the upper body and the lower body tends to be exposed outside the upper body and the lower body. Thus, appearance integrity of the electronic device cannot be maintained, resulting in a less attractive design.

SUMMARY OF THE INVENTION

The invention provides an electronic device in which an upper decoration plate and a lower decoration plate cover a dual-shaft hinge module, so as to avoid a problem that the dual-shaft hinge module is exposed outside the electronic device.

The electronic device of the invention includes an upper body, a lower body and a dual-shaft hinge module. The upper body includes a display module and an upper decoration plate covering a portion of the display module. The lower body includes an input module and a lower decoration plate covering a portion of the input module. The dual-shaft hinge module pivotally connects the upper body to the lower body. The dual-shaft hinge module includes a bottom plate, and a first curled-circular part and a second curled-circular part bent extending from two opposite sides of the bottom plate. When the upper body is flipped open relative to the lower body, the upper decoration plate and the lower decoration plate respectively cover the first curled-circular part and the second curled-circular part. When the upper body covers the lower body, the upper decoration plate and the lower decoration plate respectively extend between the first curled-circular part and the bottom plate and between the second curled-circular part and the bottom plate.

In an embodiment of the invention, a portion of the upper decoration plate that extends between the first curled-circular part and the bottom plate has a first thickness, and a distance between the first curled-circular part and the bottom plate is greater than the first thickness. A portion of the lower decoration plate that extends between the second curled-circular part and the bottom plate has a second thickness, and a distance between the second curled-circular part and the bottom plate is greater than the second thickness.

In an embodiment of the invention, a portion of the upper decoration plate that covers the display module has a third thickness, and the third thickness is greater than the first thickness. A portion of the lower decoration plate that covers the input module has a fourth thickness, and the fourth thickness is greater than the second thickness.

In an embodiment of the invention, when the upper body is flipped open relative to the lower body to become coplanar with the lower body, a projection of the upper decoration plate on the bottom plate at least covers a projection of the first curled-circular part on the bottom plate, and a projection of the lower decoration plate on the bottom plate at least covers a projection of the second curled-circular part on the bottom plate.

In an embodiment of the invention, when the upper body is flipped open relative to the lower body to become coplanar with the lower body, the upper decoration plate and the lower decoration plate respectively extend to positions at half a height of the first curled-circular part and the second curled-circular part.

In an embodiment of the invention, the portion of the upper decoration plate that extends between the first curled-circular part and the bottom plate has an arc shape corresponding to the radian of the first curled-circular part, and the portion of the lower decoration plate that extends between the second curled-circular part and the bottom plate has an arc shape corresponding to the radian of the second curled-circular part.

In an embodiment of the invention, a first gap is formed between the upper decoration plate and the first curled-circular part, a second gap is forming between the lower decoration plate and the second curled-circular part, an inner diameter of the portion of the upper decoration plate that extends between the first curled-circular part and the bottom plate is equal to the sum of an outer diameter of the first curled-circular part and the first gap, and an inner diameter of the portion of the lower decoration plate that extends between the second curled-circular part and the bottom plate is equal to the sum of an outer diameter of the second curled-circular part and the second gap.

In an embodiment of the invention, the dual-shaft hinge module includes an outer cover and a fixing element, the bottom plate includes a through hole, and the fixing element passes through the through hole to fix the bottom plate to the outer cover.

In an embodiment of the invention, the dual-shaft hinge module further includes a decoration plate covering the fixing element.

In an embodiment of the invention, a distance between the first curled-circular part and the second curled-circular part is greater than the sum of a thickness of the upper decoration plate, a thickness of the lower decoration plate and a width of the fixing element.

Based on the above, in the dual-shaft hinge module of the invention, space for accommodating the upper decoration plate and the lower decoration plate is provided respectively between the first curled-circular part and the bottom plate and between the second curled-circular part and the bottom plate. When the upper body covers the lower body, the upper decoration plate and the lower decoration plate respectively extend between the first curled-circular part and the bottom plate and between the second curled-circular part and the bottom plate. When the upper body is flipped open relative to the lower body, the upper decoration plate and the lower decoration plate respectively cover the first curled-circular part and the second curled-circular part of the dual-shaft hinge module, so as to prevent the first curled-circular part and the second curled-circular part from being exposed outside the electronic device.

To make the above features and advantages of the invention more comprehensible, embodiments accompanied with drawings are described in detail as follows.

DETAILED DESCRIPTION OF DISCLOSED EMBODIMENTS

Figure 1A:
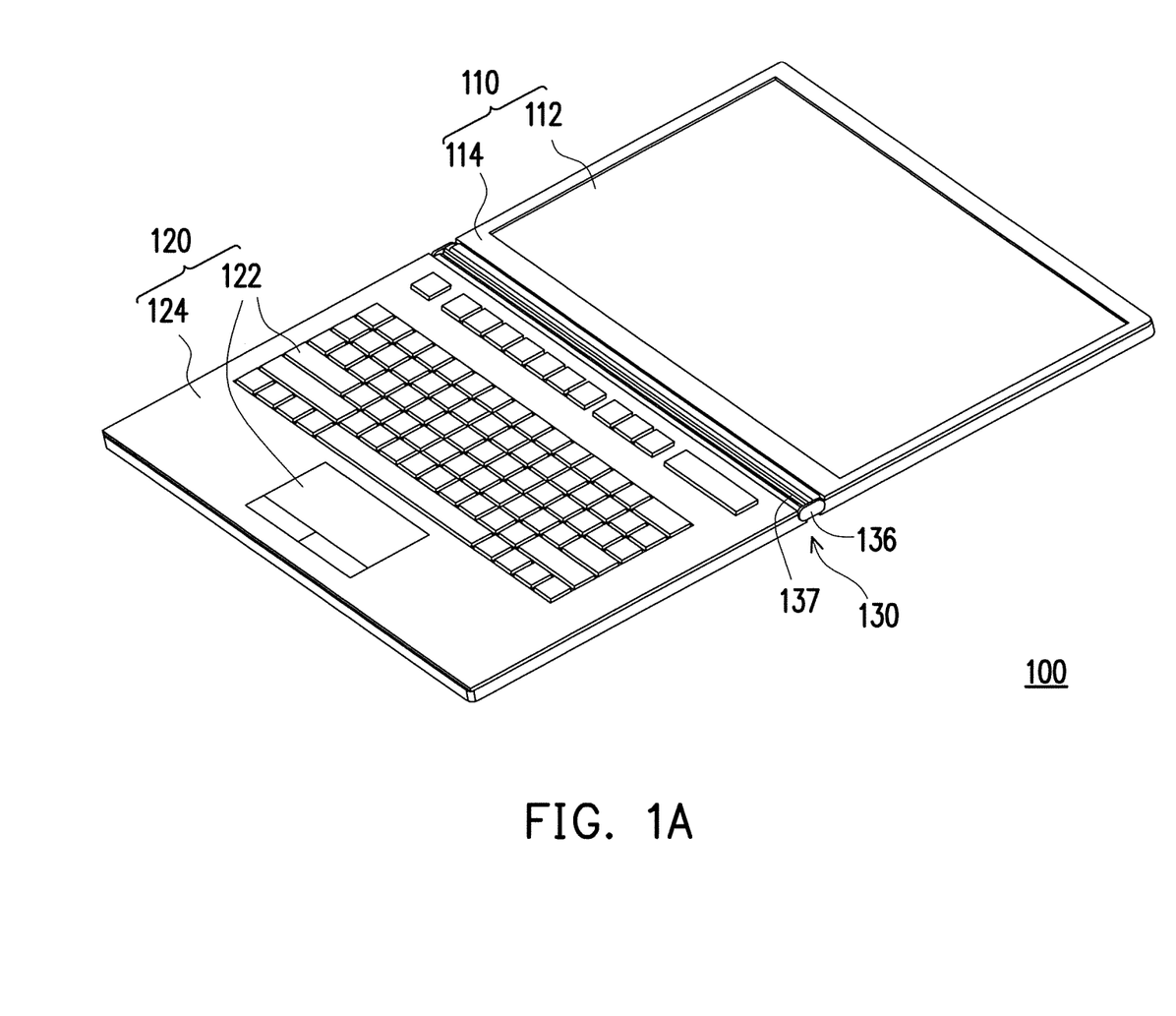
FIG. 1A is a schematic view showing that, in an electronic device according to an embodiment of the invention, an upper body is flipped open relative to a lower body.
Figure 1B:
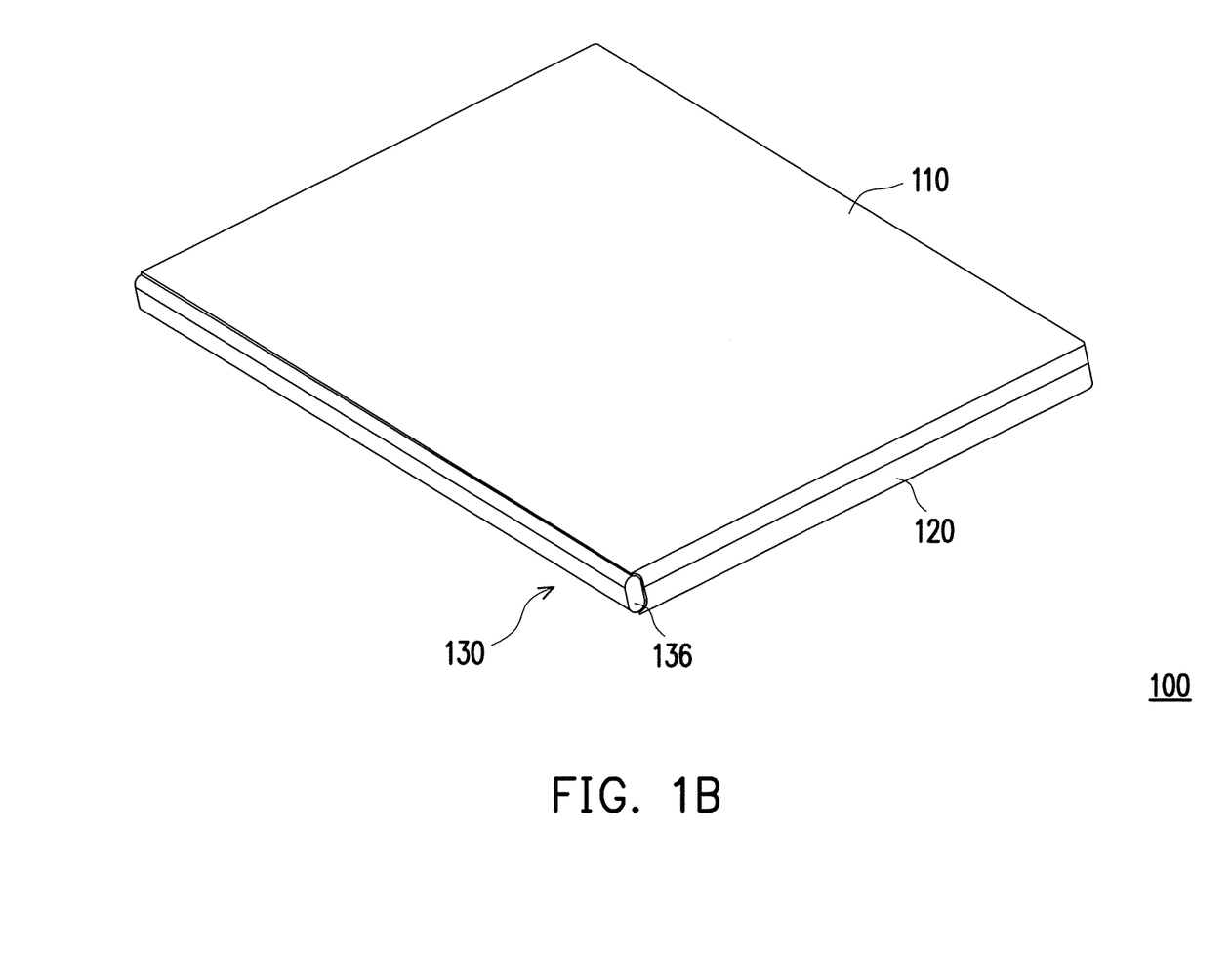
FIG. 1B is a schematic view from another angle, showing that, in the electronic device according to an embodiment of the invention, the upper body covers the lower body.
Figure 2:
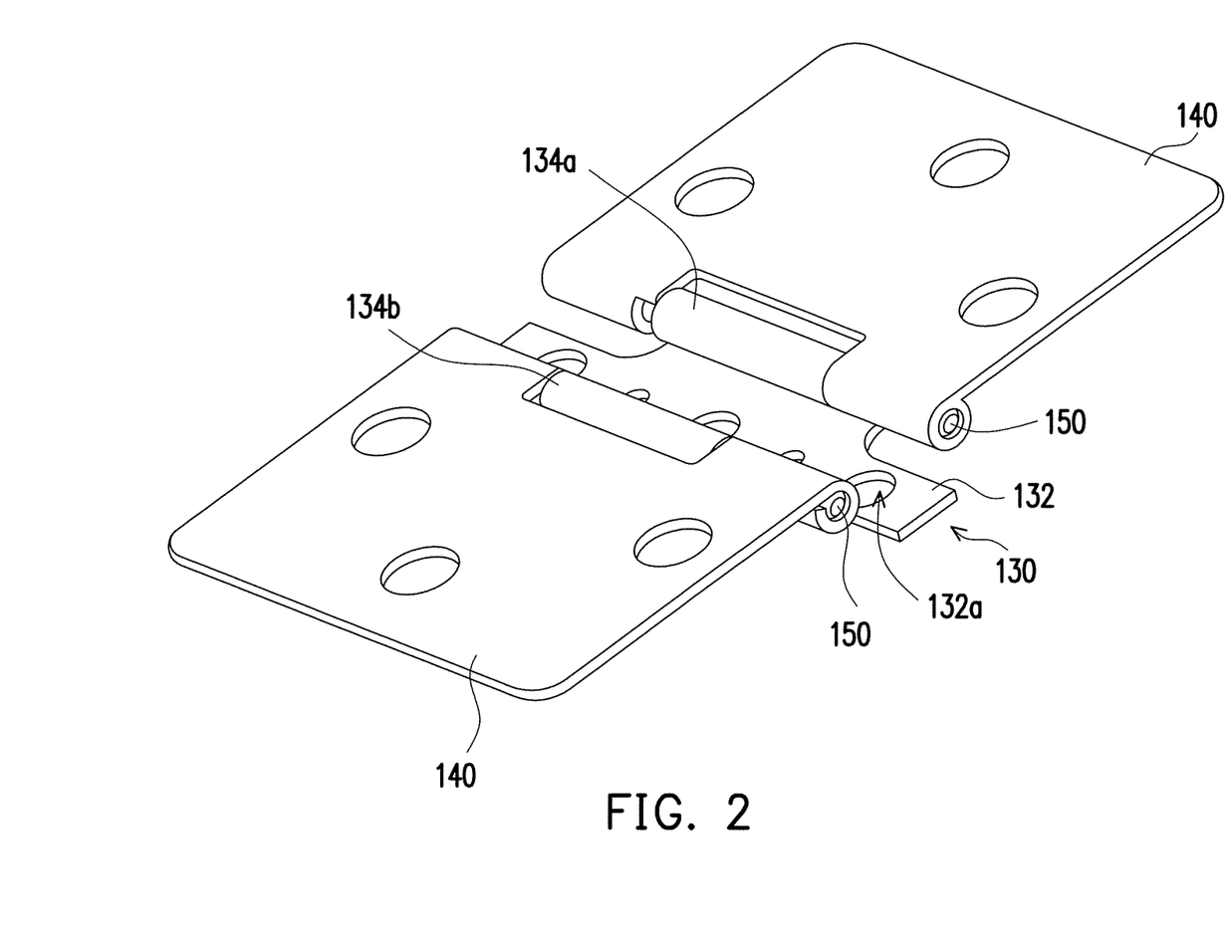
FIG. 2 is a schematic view of a dual-shaft hinge module, a fixation holder and a hinge in FIG. 1A.
Figure 3:
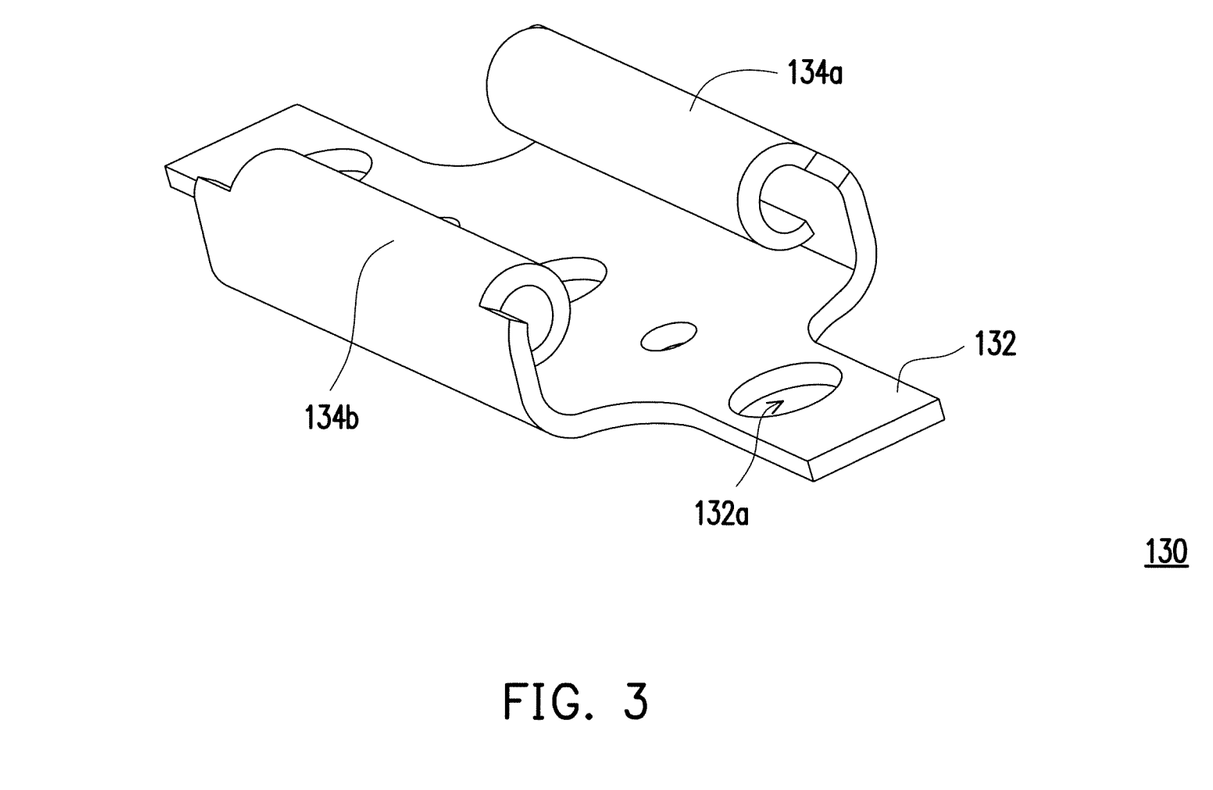
FIG. 3 is a schematic view of the dual-shaft hinge module in FIG. 2.
Figure 4A:
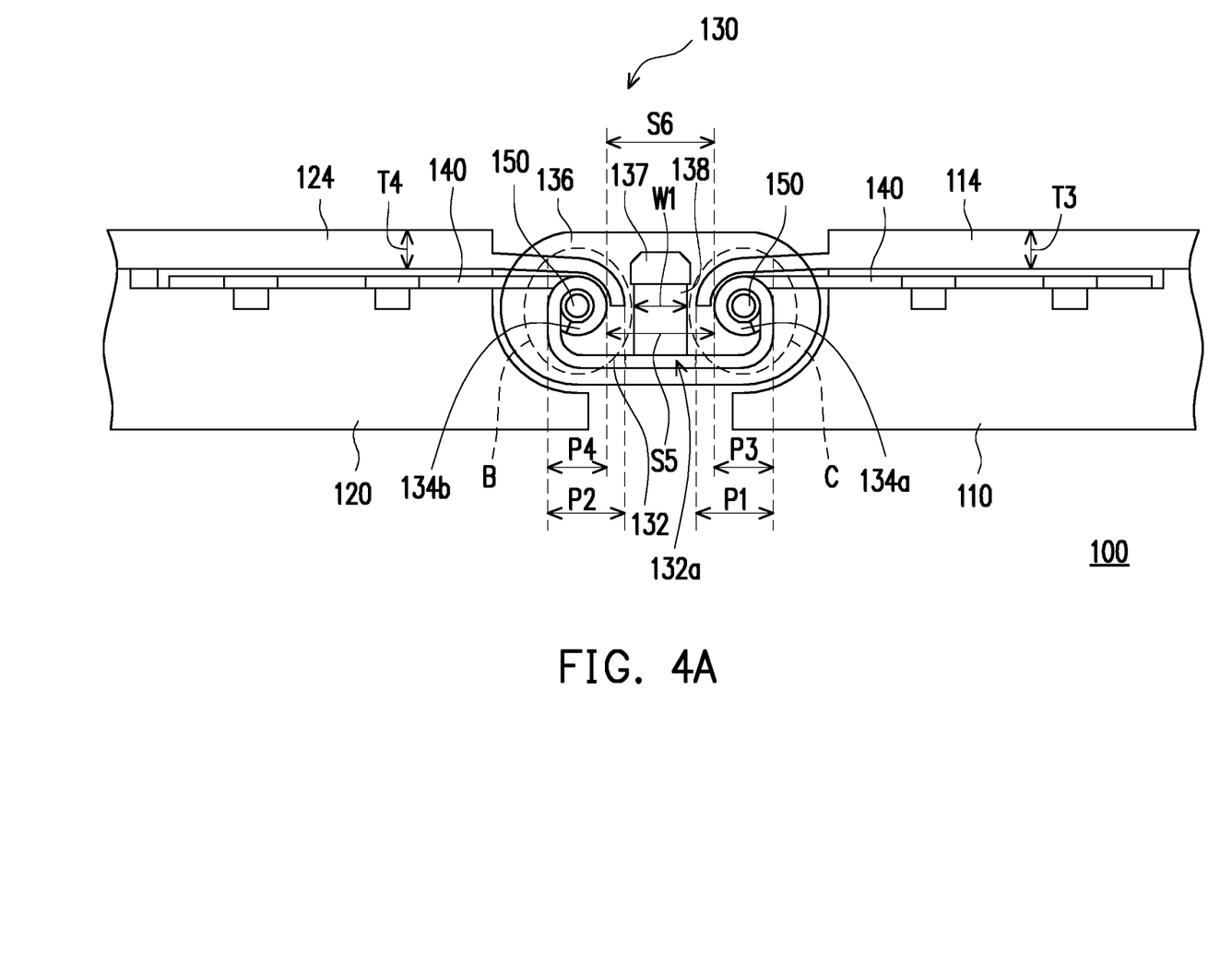
FIG. 4A is a partial side view of the electronic device in FIG. 1A.
Figure 4B:
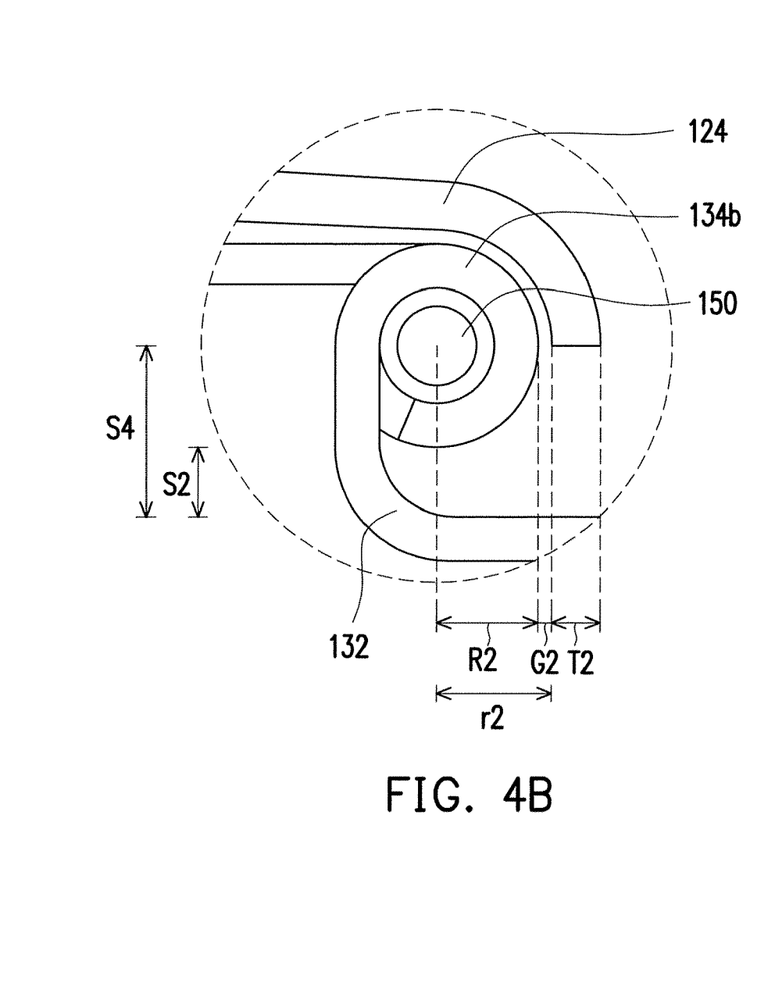
FIG. 4B is a partial enlarged view of portion B in FIG. 4A.
Figure 4C:
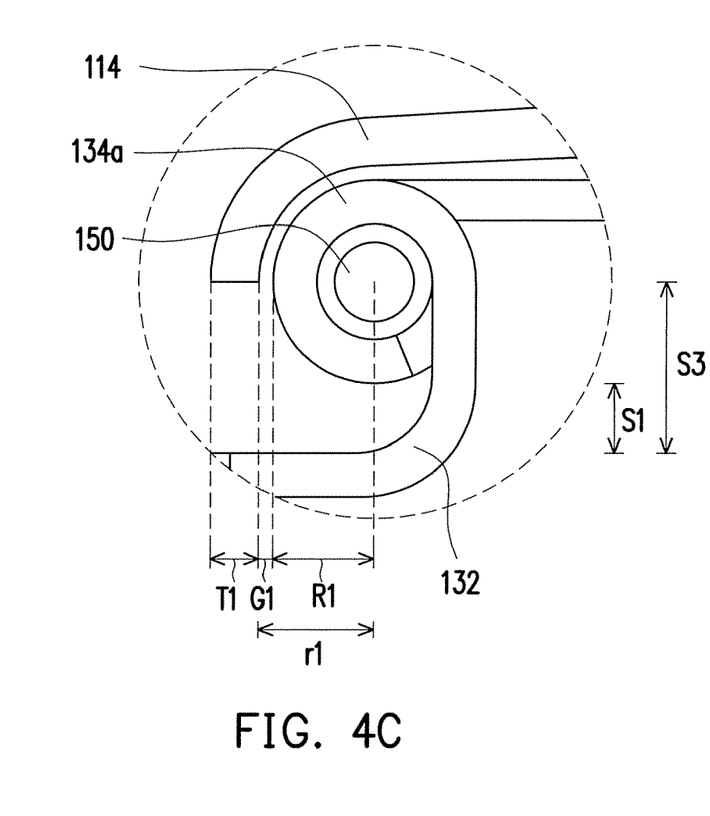
FIG. 4C is a partial enlarged view of portion C in FIG. 4A.
Figure 5A:
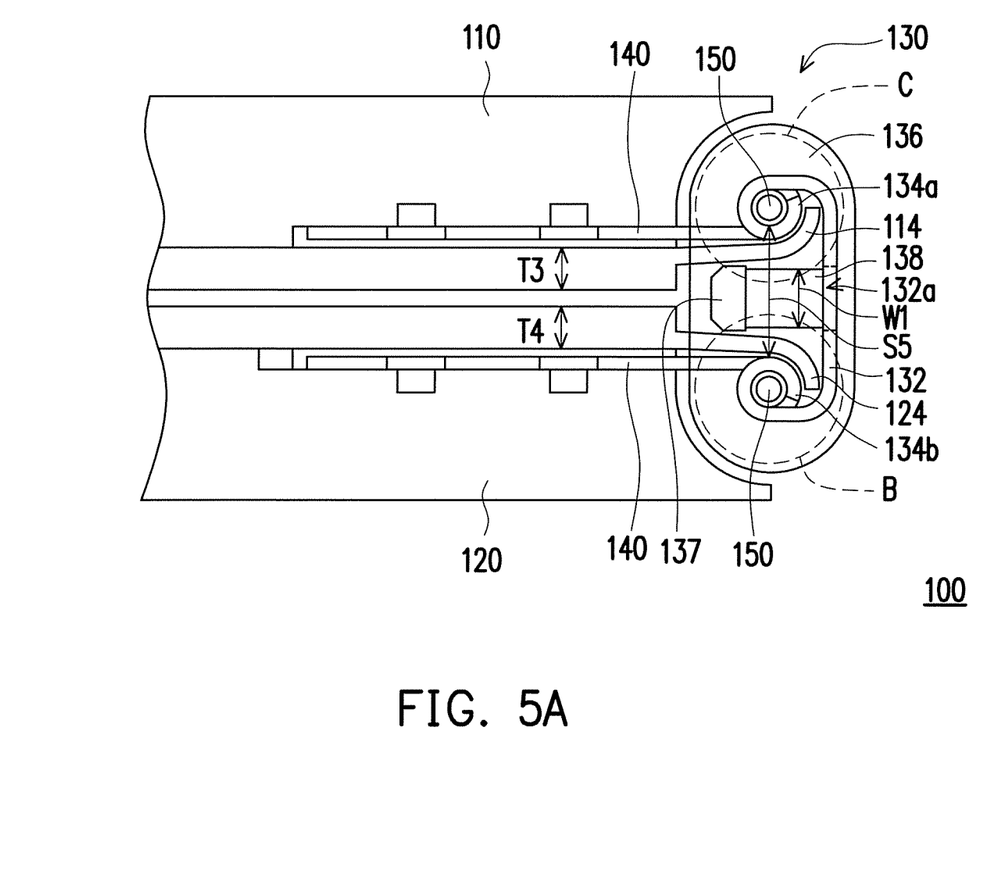
FIG. 5A is a partial side view of the electronic device in FIG. 1B.
Figure 5B:
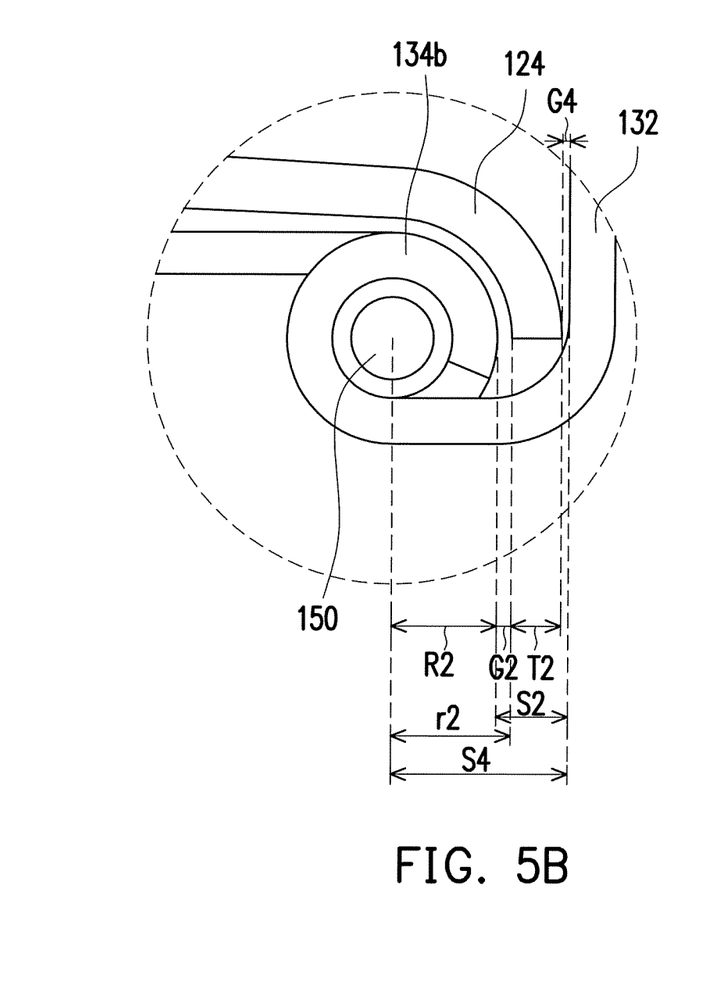
FIG. 5B is a partial enlarged view of portion B in FIG. 5A.
Figure 5C:
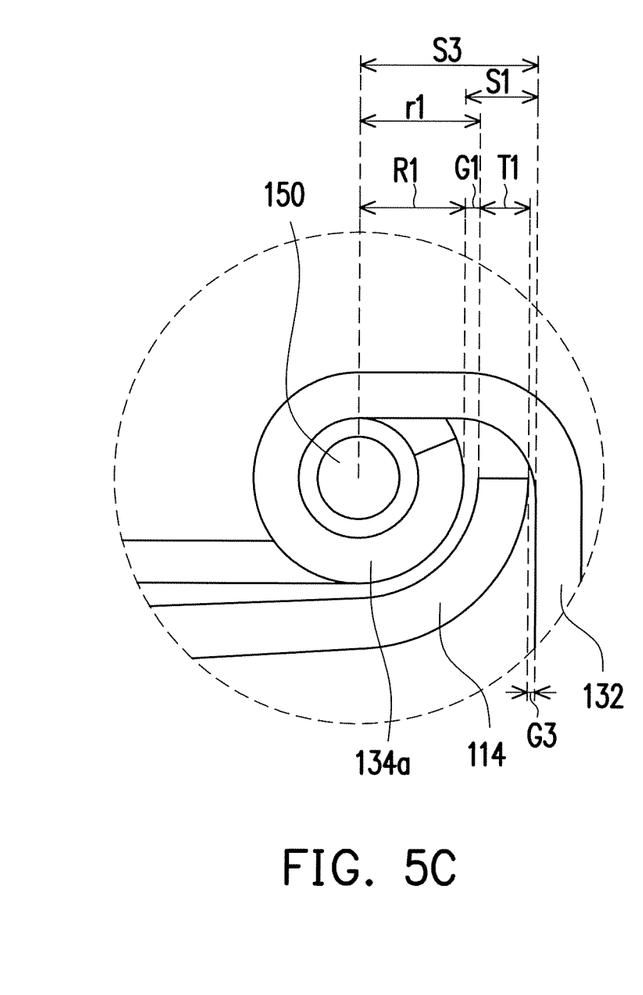
FIG. 5C is a partial enlarged view of portion C in FIG. 5A.

FIG. 1A is a schematic view showing that, in an electronic device according to an embodiment of the invention, an upper body is flipped open relative to a lower body. FIG. 1B is a schematic view from another angle, showing that, in the electronic device according to an embodiment of the invention, the upper body covers the lower body, wherein FIG. 1B schematically shows that in the electronic device in FIG. 1A, the upper body covers the lower body, and the electronic device is rotated 180 degrees. FIG. 2 is a schematic view of a dual-shaft hinge module, a fixation holder and a hinge in FIG. 1A. FIG. 3 is a schematic view of the dual-shaft hinge module in FIG. 2. FIG. 4A is a partial side view of the electronic device in FIG. 1A. FIG. 4B is a partial enlarged view of portion B in FIG. 4A. FIG. 4C is a partial enlarged view of portion C in FIG. 4A. FIG. 5A is a partial side view of the electronic device in FIG. 1B. FIG. 5B is a partial enlarged view of portion B in FIG. 5A. FIG. 5C is a partial enlarged view of portion C in FIG. 5A. Among them, FIG. 4A and FIG. 5A show an upper body 110, a lower body 120, an outer cover 136 and a fixation holder 140 in a perspective manner. Referring to FIGS. 1A to 5C, an electronic device 100 of the present embodiment is, for example, a notebook computer or a foldable electronic device. The invention is not limited thereto.

The electronic device 100 of the present embodiment includes the upper body 110, the lower body 120 and a dual-shaft hinge module 130. The upper body 110 includes a display module 112, and an upper decoration plate 114 covering a portion of the display module 112. The lower body 120 includes an input module 122, and a lower decoration plate 124 covering a portion of the input module 122.

The dual-shaft hinge module 130 pivotally connects the upper body 110 to the lower body 120. The dual-shaft hinge module 130 includes a bottom plate 132, and a first curled-circular part 134a and a second curled-circular part 134b bent extending from two opposite sides of the bottom plate 132. When the upper body 110 is flipped open relative to the lower body 120, the upper decoration plate 114 and the lower decoration plate 124 respectively cover the first curled-circular part 134a and the second curled-circular part 134b. When the upper body 110 covers the lower body 120, the upper decoration plate 114 and the lower decoration plate 124 respectively extend between the first curled-circular part 134a and the bottom plate 132 and between the second curled-circular part 134b and the bottom plate 132.

The display module 112 of the upper body 110 of the present embodiment is, for example, a screen of the notebook computer, and is adapted to display information that a user wishes to know, such as electric quantity, time, weather and so on. The input module 122 of the lower body 120 is, for example, a keyboard and a touchpad of the notebook computer. The bottom plate 132 and the first curled-circular part 134a and the second curled-circular part 134b extending from the bottom plate 132 are, for example, formed integrally into one piece which has a substantial U-shape. In the present embodiment, the upper body 110 is, for example, fixed to one fixation holder 140, and the lower body 120 is, for example, fixed to another fixation holder 140. By disposing the one fixation holder 140 and the first curled-circular part 134a around the hinge 150, and disposing the another fixation holder 140 and the second curled-circular part 134b around another hinge 150, the upper body 110 and the lower body 120 are respectively pivotally connected to the dual-shaft hinge module 130. However, the invention does not limit the manner in which the upper body 110 and the lower body 120 are respectively pivotally connected to the dual-shaft hinge module 130. Moreover, the upper body 110 and the lower body 120 may also be pivotally connected by a plurality of bottom plates 132, first curled-circular parts 134a, second curled-circular parts 134b, fixation holders 140 and hinges 150.

In the present embodiment, the upper body 110 and the upper decoration plate 114 are adapted to rotate around the first curled-circular part 134a, and the lower body 120 and the lower decoration plate 124 are adapted to rotate around the second curled-circular part 134b, so that the upper body 110 can be flipped open relative to the lower body 120 or can cover the lower body 120. When the upper body 110 is flipped open relative to the lower body 120 to become coplanar with the lower body 120, a projection P1 of the upper decoration plate 114 on the bottom plate 132 at least covers a projection P3 of the first curled-circular part 134a on the bottom plate 132, and a projection P2 of the lower decoration plate 124 on the bottom plate 132 at least covers a projection P4 of the second curled-circular part 134b on the bottom plate 132. Preferably, the upper decoration plate 114 and the lower decoration plate 124 respectively extend to positions at half a height of the first curled-circular part 134a and the second curled-circular part 134b, i.e., positions at half circle of the first curled-circular part 134a and the second curled-circular part 134b. In this way, the first curled-circular part 134a and the second curled-circular part 134b are prevented from being exposed outside the electronic device 100. When the user flips open and uses the electronic device 100, they will not see the first curled-circular part 134a and the second curled-circular part 134b between the upper body 110 and the lower body 120, and can thus enjoy a better visual experience.

In the present embodiment, a portion of the upper decoration plate 114 that extends between the first curled-circular part 134a and the bottom plate 132 has an arc shape corresponding to the radian of the first curled-circular part 134a, a portion of the lower decoration plate 124 that extends between the second curled-circular part 134b and the bottom plate 132 has an arc shape corresponding to the radian of the second curled-circular part 134b. Accordingly, the upper decoration plate 114 and the lower decoration plate 124 can smoothly rotate around the first curled-circular part 134a and the second curled-circular part 134b, respectively, thus enabling the user to easily flip open or close the upper body 110 relative to the lower body 120. In the present embodiment, the portion of the upper decoration plate 114 that extends between the first curled-circular part 134a and the bottom plate 132 has a first thickness T1, a portion of the upper decoration plate 114 that covers the display module 112 has a third thickness T3, and the third thickness T3 is greater than the first thickness T1. The portion of the lower decoration plate 124 that extends between the second curled-circular part 134b and the bottom plate 132 has a second thickness T2, a portion of the lower decoration plate 124 that covers the input module 122 has a fourth thickness T4, and the fourth thickness T4 is greater than the second thickness T2. A distance S1 between the first curled-circular part 134a and the bottom plate 132 is greater than the first thickness T1, and a distance S2 between the second curled-circular part 134b and the bottom plate 132 is greater than the second thickness T2. Accordingly, when the upper body 110 covers the lower body 120, the upper decoration plate 114 and the lower decoration plate 124, in addition to covering the first curled-circular part 134a and the second curled-circular part 134b, respectively extend between the first curled-circular part 134a and the bottom plate 132 and between the second curled-circular part 134b and the bottom plate 132. That is, since the distance S1 between the first curled-circular part 134a and the bottom plate 132 is greater than the first thickness T1, and the distance S2 between the second curled-circular part 134b and the bottom plate 132 is greater than the second thickness T2, additional space is provided in the dual-shaft hinge module 130 for accommodating the upper decoration plate 114 and the lower decoration plate 124. Therefore, when the upper body 110 covers the lower body 120, the upper decoration plate 114 and the lower decoration plate 124 can respectively smoothly extend between the first curled-circular part 134a and the bottom plate 132 and between the second curled-circular part 134b and the bottom plate 132.

In the present embodiment, a first gap G1 is formed between the upper decoration plate 114 and the first curled-circular part 134a, and a second gap G2 is formed between the lower decoration plate 124 and the second curled-circular part 134b. By the first gap G1 and the second gap G2, the upper decoration plate 114 and the lower decoration plate 124 are prevented from rubbing against each other and being damaged during their rotation around the first curled-circular part 134a and the second curled-circular part 134b respectively. An inner diameter r1 of the portion of the upper decoration plate 114 that extends between the first curled-circular part 134a and the bottom plate 132 is equal to the sum of an outer diameter R1 of the first curled-circular part 134a and the first gap G1. An inner diameter r2 of the portion of the lower decoration plate 124 that extends between the second curled-circular part 134b and the bottom plate 132 is equal to the sum of an outer diameter R2 of the second curled-circular part 134b and the second gap G2. In addition, a third gap G3 is formed between the upper decoration plate 114 and the bottom plate 132, and a fourth gap G4 is formed between the lower decoration plate 124 and the bottom plate 132. Accordingly, when the upper decoration plate 114 and the lower decoration plate 124 respectively extend between the first curled-circular part 134a and the bottom plate 132 and between the second curled-circular part 134b and the bottom plate 132, the upper decoration plate 114 and the lower decoration plate 124 are prevented from rubbing against each other and being damaged. That is, a distance S3 between the center of circle of the first curled-circular part 134a and the bottom plate 132 is equal to the sum of the outer diameter R1 of the first curled-circular part 134a, the first gap G1, the first thickness T1 of the upper decoration plate 114, and the third gap G3, and a distance S4 between the center of circle of the second curled-circular part 134b and the bottom plate 132 is equal to the sum of the outer diameter R2 of the second curled-circular part 134b, the second gap G2, the second thickness T2 of the lower decoration plate 124, and the fourth gap G4.

In the present embodiment, the dual-shaft hinge module 130 further includes the outer cover 136, a fixing element 138 and a decoration plate 137. The outer cover 136, for example, covers two side edges and an outside of the dual-shaft hinge module 130, so as to also prevent the dual-shaft hinge module 130 from being exposed to two side edges and an outside of the electronic device 100. The bottom plate 132 of the dual-shaft hinge module 130 includes a through hole 132a, and the fixing element 138 passes through the through hole 132a to fix the bottom plate 132 to the outer cover 136. The fixing element 138 is, for example but not limited to, a screw. Moreover, a plurality of fixing elements 138 may pass through a plurality of corresponding through holes 132a to fix the bottom plate 132 to the outer cover 136. The fixing element 138 is located between the first curled-circular part 134a and the second curled-circular part 134b. Therefore, a distance S6 between the first curled-circular part 134a and the second curled-circular part 134b is greater than the sum of the first thickness T1 of the upper decoration plate 114, the second thickness T2 of the lower decoration plate 124, and a width W1 of the fixing element 138. The decoration plate 137 covers the fixing element 138, so as to prevent the fixing element 138 from being exposed outside the electronic device 100, and moreover, to cover the bottom plate 132 between the first curled-circular part 134a and the second curled-circular part 134b, so that appearance integrity of the electronic device 100 is maintained.

In summary, in the dual-shaft hinge module of the invention, space for allowing the upper decoration plate and the lower decoration plate to extend therein is provided respectively between the first curled-circular part and the bottom plate and between the second curled-circular part and the bottom plate. When the upper body covers the lower body, the upper decoration plate and the lower decoration plate can respectively smoothly extend between the first curled-circular part and the bottom plate and between the second curled-circular part and the bottom plate. When the upper body is flipped open relative to the lower body, the upper decoration plate and the lower decoration plate respectively cover the first curled-circular part and the second curled-circular part of the dual-shaft hinge module, so that the user will not see the first curled-circular part and the second curled-circular part between the upper body and the lower body. In addition, in the invention, the outer cover covers a portion of the dual-shaft hinge module, so as to prevent the dual-shaft hinge module from being exposed to two side edges and an outside of the electronic device. Moreover, the decoration plate covers the fixing element and the bottom plate between the first curled-circular part and the second curled-circular part, so that appearance integrity of the electronic device is maintained. The electronic device of the invention has a more attractive design, which allows the user to enjoy a better visual experience in using the electronic device of the invention.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An electronic device, comprising:
    an upper body, comprising a display module and an upper decoration plate covering a portion of the display module;
    a lower body, comprising an input module and a lower decoration plate covering a portion of the input module; and
    a dual-shaft hinge module, pivotally connecting the upper body to the lower body, the dual-shaft hinge module comprising a bottom plate, and a first curled-circular part and a second curled-circular part bent extending from two opposite sides of the bottom plate, wherein
    when the upper body is flipped open relative to the lower body, the upper decoration plate and the lower decoration plate respectively cover the first curled-circular part and the second curled-circular part, and
    when the upper body covers the lower body, the upper decoration plate and the lower decoration plate respectively extend between the first curled-circular part and the bottom plate and between the second curled-circular part and the bottom plate.

2. The electronic device according to claim 1, wherein a portion of the upper decoration plate that extends between the first curled-circular part and the bottom plate has a first thickness, and a distance between the first curled-circular part and the bottom plate is greater than the first thickness; and a portion of the lower decoration plate that extends between the second curled-circular part and the bottom plate has a second thickness, and a distance between the second curled-circular part and the bottom plate is greater than the second thickness.

3. The electronic device according to claim 2, wherein a portion of the upper decoration plate that covers the display module has a third thickness, and the third thickness is greater than the first thickness; and a portion of the lower decoration plate that covers the input module has a fourth thickness, and the fourth thickness is greater than the second thickness.

4. The electronic device according to claim 1, wherein when the upper body is flipped open relative to the lower body to become coplanar with the lower body, a projection of the upper decoration plate on the bottom plate at least covers a projection of the first curled-circular part on the bottom plate, and a projection of the lower decoration plate on the bottom plate at least covers a projection of the second curled-circular part on the bottom plate.

5. The electronic device according to claim 1, wherein when the upper body is flipped open relative to the lower body to become coplanar with the lower body, the upper decoration plate and the lower decoration plate respectively extend to positions at half a height of the first curled-circular part and the second curled-circular part.

6. The electronic device according to claim 1, wherein a portion of the upper decoration plate that extends between the first curled-circular part and the bottom plate has an arc shape corresponding to the radian of the first curled-circular part, and a portion of the lower decoration plate that extends between the second curled-circular part and the bottom plate has an arc shape corresponding to the radian of the second curled-circular part.

7. The electronic device according to claim 1, wherein a first gap is formed between the upper decoration plate and the first curled-circular part, a second gap is formed between the lower decoration plate and the second curled-circular part, an inner diameter of a portion of the upper decoration plate that extends between the first curled-circular part and the bottom plate is equal to the sum of an outer diameter of the first curled-circular part and the first gap, and an inner diameter of a portion of the lower decoration plate that extends between the second curled-circular part and the bottom plate is equal to the sum of an outer diameter of the second curled-circular part and the second gap.

8. The electronic device according to claim 1, wherein the dual-shaft hinge module comprises an outer cover and a fixing element, the bottom plate comprises a through hole, and the fixing element passes through the through hole to fix the bottom plate to the outer cover.

9. The electronic device according to claim 8, wherein the dual-shaft hinge module further comprises a decoration plate covering the fixing element.

10. The electronic device according to claim 8, wherein a distance between the first curled-circular part and the second curled-circular part is greater than the sum of a thickness of the upper decoration plate, a thickness of the lower decoration plate and a width of the fixing element.

* * * * *